United States Patent [19]

Jenn-Chyou

[11] Patent Number: 4,987,636
[45] Date of Patent: Jan. 29, 1991

[54] SYNCHRONOUS VEHICLE WINDSHIELD WIPE AND DEFOGGER WIPER MECHANISM

[76] Inventor: Shiao Jenn-Chyou, No. 11, Alley 23, Lane 101, Sec. 4, Hsin Hai Rd., Taipei, Taiwan

[21] Appl. No.: 399,894

[22] Filed: Aug. 24, 1989

[51] Int. Cl.⁵ .............................................. B60S 1/30
[52] U.S. Cl. .............................. 15/250.28; 15/250.34
[58] Field of Search ..................... 15/250.28, 250.34; 403/355, 356, 332; 192/67 R, 108, 66

[56] References Cited

U.S. PATENT DOCUMENTS

| 1,260,077 | 3/1918 | Shirey et al. | 403/355 |
| 1,515,100 | 11/1924 | Foster | 192/108 |
| 1,860,281 | 5/1932 | Gentil | 15/250.28 |
| 2,801,530 | 8/1957 | Holt | 464/57 |
| 2,879,535 | 3/1959 | Cerro | 15/250.28 |
| 2,937,042 | 5/1960 | Wilder | 403/356 |
| 4,327,821 | 5/1982 | Telford | 192/67 R |

Primary Examiner—Harvey C. Hornsby
Assistant Examiner—P. Brinson
Attorney, Agent, or Firm—Ho & Chu

[57] ABSTRACT

The present disclosure relates to a synchronous vehicle windshield wiper and defogger wiper mechanism, and more particularly to a mechanism wherein a defogger wiper is disposed inside a vehicle windshield and is driven directly by the power driving a windshield wiper, whereby the defogger wiper and windshield wiper can wipe synchronously.

2 Claims, 5 Drawing Sheets

SYNCHRONOUS VEHICLE WINDSHIELD WIPE AND DEFOGGER WIPER MECHANISM

BACKGROUND OF THE INVENTION

When it rains or in cold weather, a driver always shuts all vehicle windows to protect himself/herself from catching a cold or getting wet. However, this will cause a higher in-vehicle temperature different from the outside temperature and therefore cause the windshield to be covered with moisture. As a result, the vision of the driver will become obscured so as to adversely affect driving security.

Generally, there are two ways to eliminate the moisture. One is to activate the air-conditioner, and the other is to wipe the windshield manually. The former takes effect slowly, while the latter requires manual actions and is quite dangerous when the vehicle is running, especially on a highway. Moreover, some vehicles, such as delivery cars or camions, are not provided with air-conditioning devices and some vehicles may be equipped with poor or damaged air-conditioning devices. In this case, the moisture attached to the windshield must be eliminated manually, thus causing great inconvenience.

SUMMARY OF THE INVENTION

It is therefore an object of the present invention to provide a mechanism wherein a defogger wiper is disposed inside a windshield and is driven along with a windshield wiper whereby the defogger wiper and windshield wiper can wipe synchronously.

The present invention includes a defogger wiper shaft a front end of which is formed with a slant cut face having a tail recess, and a drive pipe fitted to the defogger wiper shaft and formed with an axial strip projection. A cable is used to pull the drive pipe and move the same toward the defogger wiper shaft, making the strip projection enter the recess whereby the defogger wipe shaft can be driven by the windshield wiper shaft, permitting the defogger wiper to wipe in accordance with the windshield wiper.

The present invention can be best understood via the following description and the accompanying drawings, wherein:

DETAILED DESCRIPTION OF THE PREFERRED EMBODIMENTS

Figure 1:
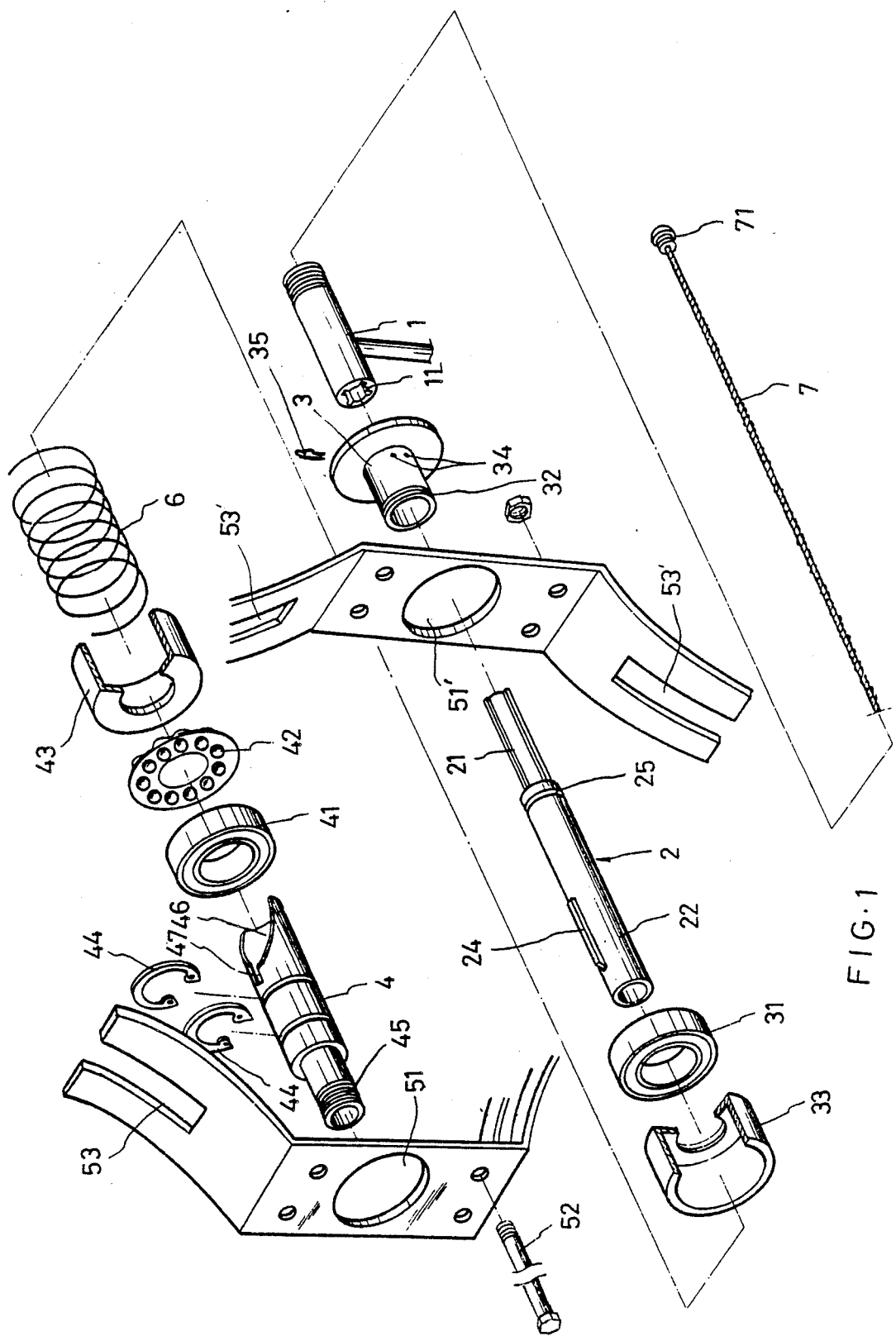
FIG. 1 is an exploded view of the present invention.
Figure 2:
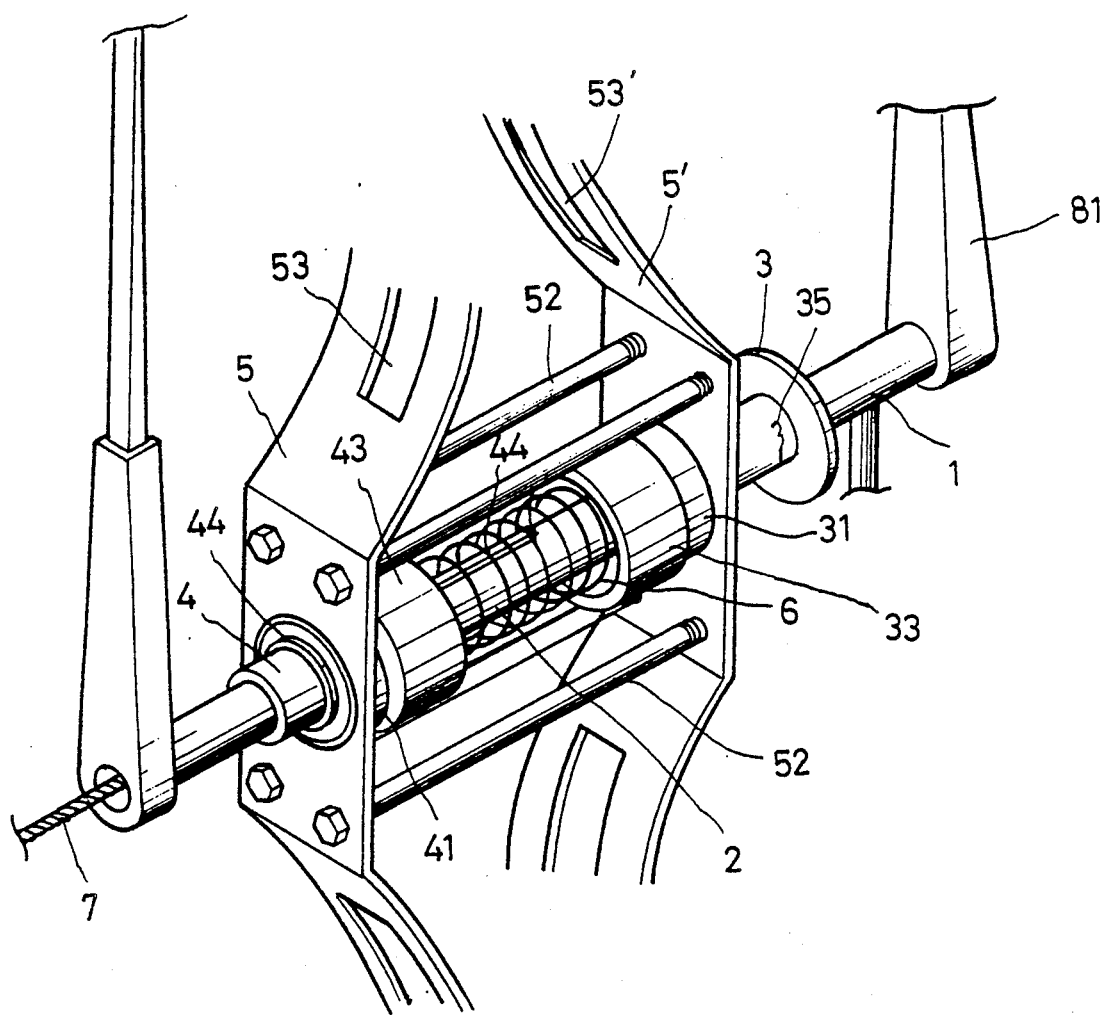
FIG. 2 is a perspective view of the present invention.
Figure 3:
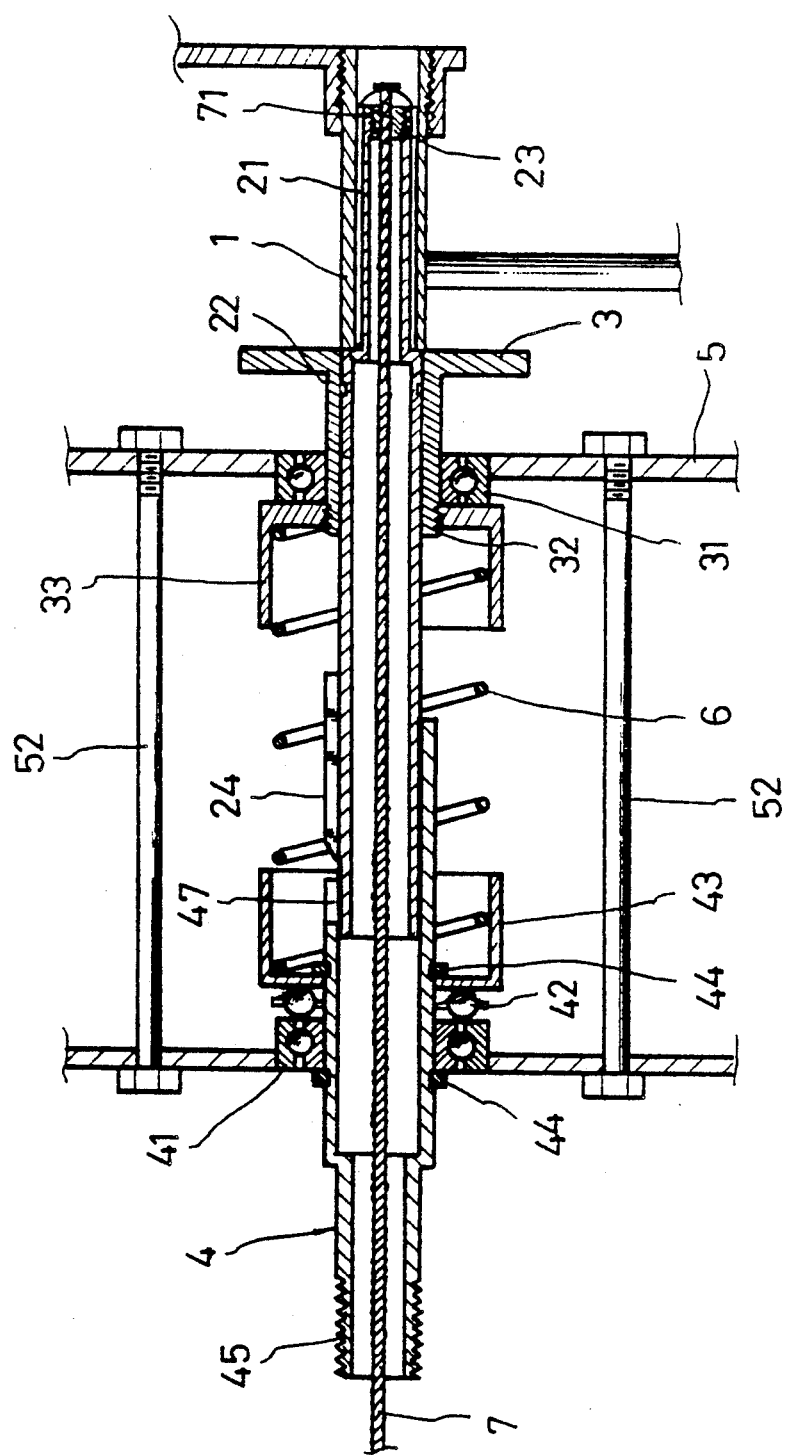
FIG. 3 is a sectional view of the present invention.

Please refer to FIGS. 1 to 3. The present invention includes a windshield wiper shaft 1, an annular drive member 2, a sleeve 3, a defogger wiper shaft 4, two securing frames 5, 5', a spring 6 and a cable 7. The windshield wiper shaft 1 is connected to wiper arm 81 of a windshield wiper at one end to drive the wiper and is provided with a substantially splined shaped shaft hole 11 whose inner surface forms a series of spline grooves. The drive pipe 2 includes a splined shaped portion 21 and a cylinder portion 22. Portion 21 forms a series of splines that mate with the spline grooves formed by hole 11. The free end of the splined shaped portion 21 is formed with a female thread 23, while the cylinder portion 22 is formed with an axial strip projection 24 and an annular groove 25. The sleeve 3 can be loosely fitted into a bearing 31 and is formed with male thread 32 at one end to be screwed on a spring support 33. Moreover, an aperture 34 is formed on the sleeve 3.

The defogger wiper support shaft 4 comprises an elongated sleeve to which a bearing 41, a ball disk 42 and a spring support 43 are sequentially fitted. Two C-shaped retainers 44 are provided to hold these elements in place. Furthermore, male thread 45 is formed on one end of the defogger wiper support sleeve 4 for connecting with a defogger wiper 9; a recess having slant cut faces 46 and a slot-like tail section 47 is formed at the other end of the defogger wiper support sleeve 4. Slanted faces 46 form a convergent guidance section between the mouth portion of the recess and the slot-like section 47. The two securing frames 5, 5' are respectively formed with two corresponding opening 51, 51' and are spaced at a proper distance by four support rods 52. In addition, each support frame is formed with two long open slots 53, 53' respectively at two ends thereof for fastening the two securing frames 5, 5' to a vehicle body. The cable 7 is connected with a screw 71 at one end and with a control knob 72 at the other end.

When assembling the above elements, the sleeve 3 with the bearing 31 and spring support 33 fitted thereto is associated with the cylinder portion 22 of the drive pipe 2, and a spring pin 35 is inserted through the aperture 34 of the sleeve 3 and the annular groove 25 of the drive member 2 to fix the sleeve 3 to the drive member 2. The cable 7 is conducted through the drive member 2 and defogger wiper support sleeve 4 with the screw 71 secured to one end of the drive member 2 and the control knob 72 mounted on the vehicle body whereby a driver can operate the cable to insert the splined shaped shaft portion 21 of the drive pipe 2 into splined shaped shaft hole 11 of the windshield wiper shaft 1. The drive member 2 and defogger wiper support sleeve 4 are respectively inserted through the corresponding opening 51, 51' of the two securing frames 5, 5', permitting the cylinder portion 22 of the drive member 2 to go into the defogger wiper support sleeve 4 with the strip projection 24 of the drive pipe 2 received in the slot section 47 of the recess in the right end portion of the defogger wiper support sleeve 4. The two bearing 41, 31 are respectively secured to the two openings 51, 51' of the securing frames 5, 5', and a spring 6 is compressed between the two spring supports 43, 33. Furthermore, the two securing frames 5, 5' are mounted on the vehicle body by two bolts 54 which go through the open slots 53, 53' of the securing frames 5, 5'.

Figure 4:
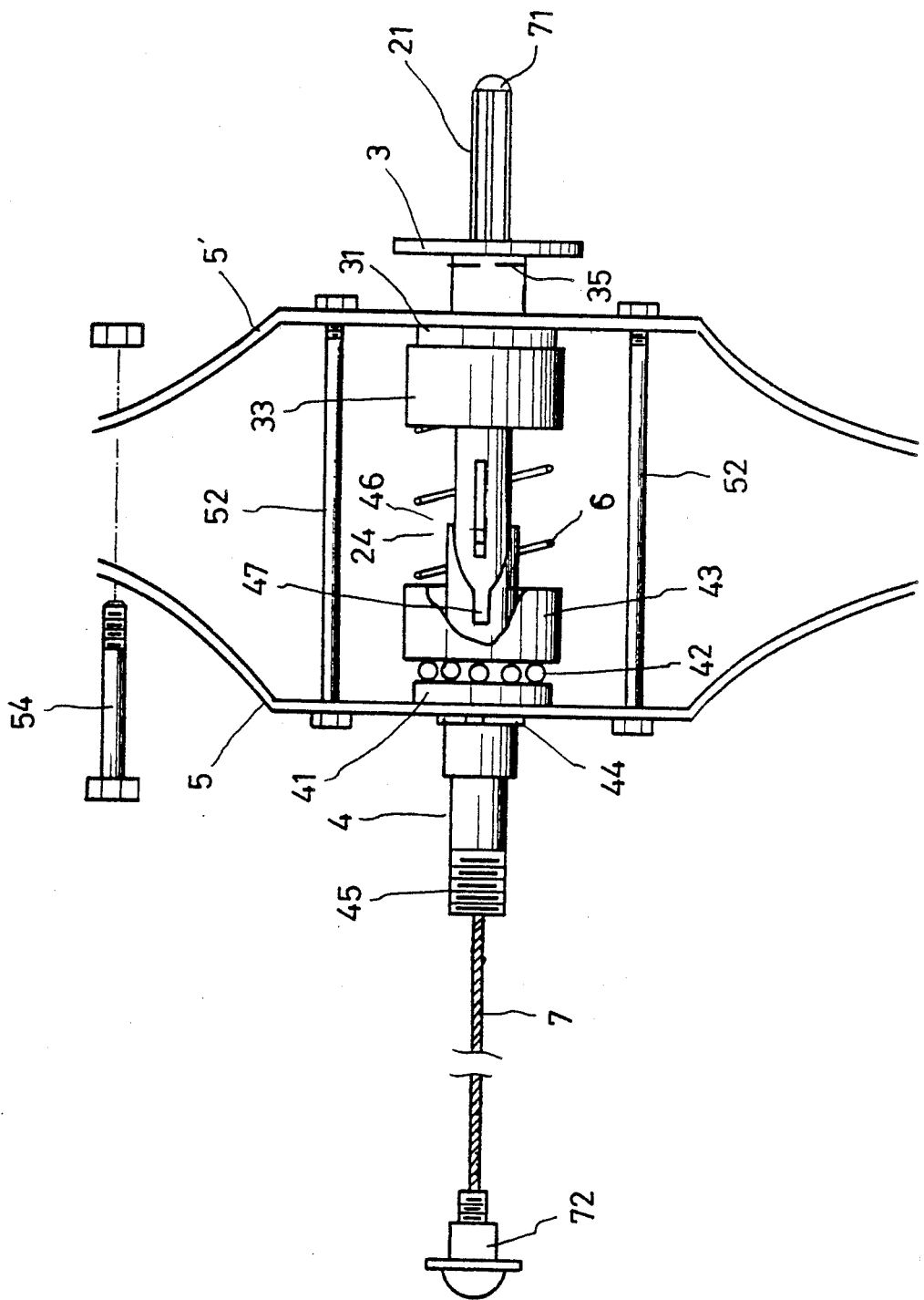
FIG. 4 shows a status in which the windshield wiper of the present invention moves along.
Figure 5:
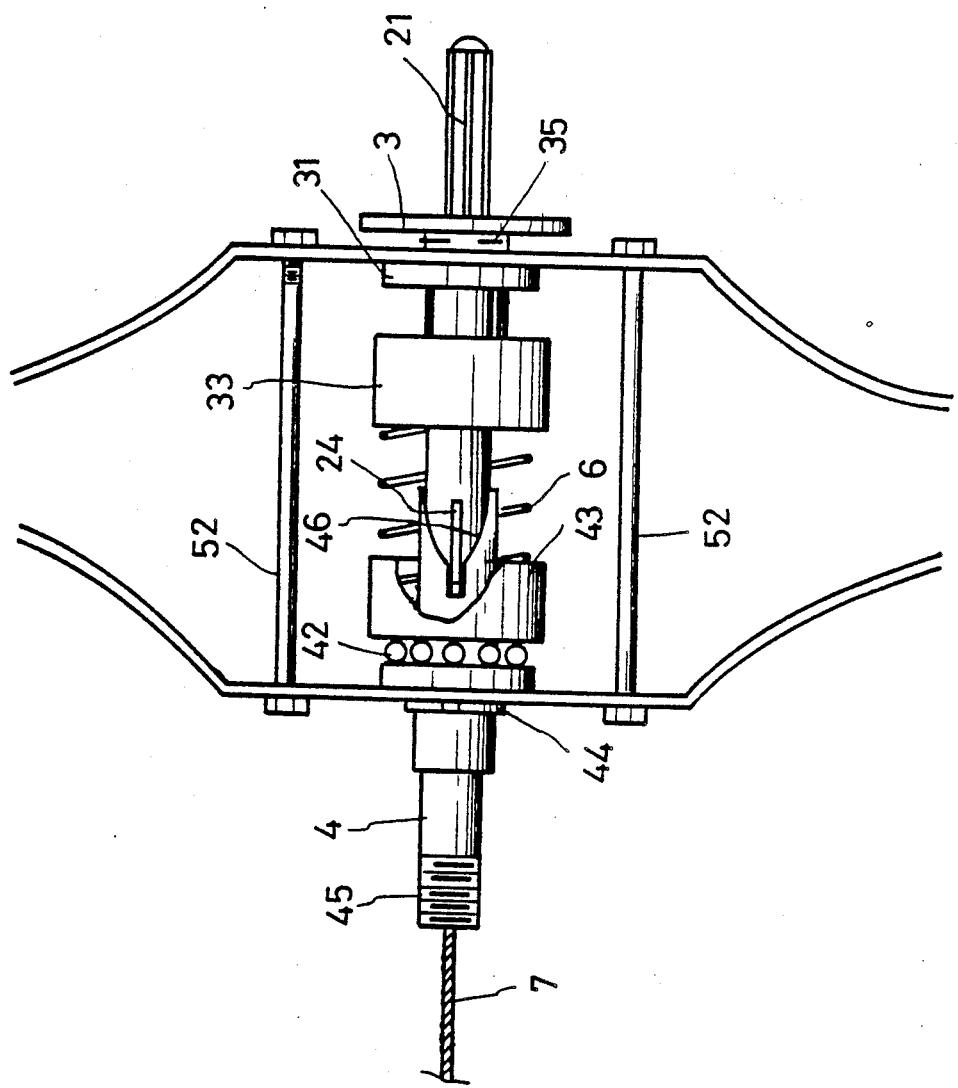
FIG. 5 shows a status in which the windshield wiper of the present invention moves together with the defogger wiper thereof.

In normal condition, as shown in FIG. 4, the strip projection 24 of the drive member 2 is located within an outer broader space between the slant cut faces 46, permitting the windshield wiper to oscillate without driving the defogger wiper support sleeve 4. When a driver desires to synchronize the windshield wiper with the defogger wiper, he can operate the control knob 72 of the cable 7 to pull the cable 7 and consequently move the drive member 2 toward the defogger wiper support sleeve 4. As a result, the strip projection 24 of the drive pipe 2 will enter the slot portion of the recess, as shown in FIG. 5. Because slot portion 47 is only slightly larger than the strip projection in width, thereby when the windshield wiper wipes, the defogger wiper is urged to correspondingly wipe. When releasing the cable 7 via the control knob 72, the drive member 2 will return to its normal position by means of restoring force of the spring 6 and shown in FIG. 4.

The bearing 31, 41 and ball disk 42 can reduce mechanical resistance to ease the driving. Moreover, the open slots 53, 53' of the securing frames 5, 5' are designed to increase elasticity thereof for the convenience of securing the present invention to various types of vehicles. Particularly, the defogger wiper and windshield wiper wipe synchronously to make the driver feel that only the windshield wiper is in his/her line of sight.

I claim:

1. A synchronous vehicle windshield wiper and defogger wiper mechanism, comprising:

two spaced frame members (5,5') adapted for fixed mounting on a vehicle body;

bearings (31,41) carried by said frame members to define a rotational axis;

a hollow oscillatable windshield wiper shaft (1) located on said rotational axis beyond the space circumscribed by said frame members, said shaft having internal spline grooves therein;

a defogger wiper support sleeve (4) extending through one one of said bearings in axially spaced relation to said windshield wiper shaft;

an axially elongated drive member (2) for said defogger wiper support sleeve, said drive member extending through the other bearing and having continuous telescopic connections with the sleeve and windshield wiper shaft; said drive member having a splined section (21) in continuous driven connection with said spline grooves, and a cylindrical section (22) slidably and rotatably extending within the sleeve;

clutch means between said drive member and said sleeve, whereby axial slidable motion of the drive member in the direction of the sleeve enables the drive member to transmit a rotary oscillatory force from the shaft to the sleeve;

said clutch means comprising an axially extending strip (24) projecting radially outwardly from said cylindrical section of the drive member, and a recess formed in said sleeve;

said recess comprising an axially extending slot section (47) that has a circumferential width dimension that is substantially the same as the width of said strip (24), said recess further comprising a mouth section that has a circumferential width dimension greater than the circumferential oscillation stroke of said strip, said recess further comprising a convergent guidance section (46) between the mouth section and slot section for guiding said strip into the slot section when said drive member is moved axially in the direction of the sleeve;

said sleeve and drive member being oriented so that said strip is at all times within the recess.

2. The mechanism of claim 1, and further comprising means for moving said drive member axially between the wiper shaft and sleeve; said moving means comprising a coil spring (6) encircling the sleeve and drive member for moving the drive member in the direction of the shaft, and a pull cord (7) extending from the drive member through the sleeve for moving the drive member in the direction of the sleeve.

* * * * *